SELECTION CIRCUIT

Filed Feb. 20, 1969

INVENTORS
PETER A. E. GARDNER
MICHAEL H. HALLETT
PETER J. TITMAN

BY W. Robertson

ATTORNEY

United States Patent Office 3,566,367

Patented Feb. 23, 1971

3,566,367
SELECTION CIRCUIT

Peter A. E. Gardner, Winchester, Michael H. Hallett, Chandler's Ford, and Peter J. Titman, Winchester, England, assignors to International Business Machines Corporation, Armonk, N.Y., a corporation of New York Filed Feb. 20, 1969, Ser. No. 800,974
Claims priority, application Great Britain, Mar. 1, 1968, 9,989/68
Int. Cl. G11c *15/00*
U.S. Cl. 340—172.5 9 Claims

ABSTRACT OF THE DISCLOSURE

This invention provides an associative memory (or other ordered array of electronic circuits) with means for stepping from word to word through the array for certain operations and a novel circuit for bypassing defective words. An array with defective components remains operable at a reduced capacity.

INTRODUCTION

The circuit of this invention is particularly useful with an associative memory. In an associative memory, a word of data is usually accessed by searching the memory according to the contents of the selected word or a part of the word. The actual location of the selected word is not significant in an associative selection. Non-associative memories by contrast are selected by address signals that are decoded to energize a particular set of components associated with the address. For certain operations in an associative memory, it is desirable to select storage locations in a predetermined, non-associative, sequence. For example, a sequence of instructions may be stored in such a way that accessing one instruction sets up circuits for accessing the next instruction. Associative addressing is required only to select the first instruction in the sequence. In the examples that will be described later, the "next" word (or group of words) is adjacent to the preceding word and is remote from an input register. From a more general standpoint, the "next" word is one which is to be bypassed to maintain the operation of the array.

One of the advantages of an associative memory is that not all the storage locations need be operable. Defective storage locations can be tolerated since such faults merely reduce the capacity of the memory. An inoperable or defective storage location will not produce data signifying outputs and will not be accessed since the presence of data is required for accessing a word. If, however, an associative memory is designed to store and access data sequentially, there is a problem that the sequence may include an inoperable storage location. An object of this invention is to provide a selection circuit that bypasses defective storage location in such a memory.

The invention also applies to other arrays of storage or logic devices. For example a data processing system may include many identical electronic circuit packages that are arranged to successively and repetitively process input data signals. Entry of the data signals to a given package is frequently controlled by a gating signal from the preceding package. The system can be made inoperable if data signals are gated to a defective package. One object of this invention is to provide a circuit for bypassing a defective circuit package. For generality, a memory word, electronic circuit package, or other unit of logic or storage components that is to be bypassed will be called a "location."

SUMMARY OF THE INVENTION

This invention provides an improved selection circuit for stepping through a sequence of operable locations and bypassing the inoperable locations. The selection circuit includes a selection signal generator and a selection sense circuit for each location. The selection circuit also includes a series connected chain of impedances (preferably resistors). The selection signal generator circuit of each location is connected to the same node of the impedance chain as the sense circuit of the next location. The selection signal generators are controlled to produce signals signifying that the operation is to step to the next location. The selection sense circuit of an operable location produces a low impedance path around the associated resistor and thereby causes its location to accept the signal from the preceding location. In an inoperable location, the sense circuit does not bypass the selection signal and the selection signal is transmitted through the resistor chain to the next operable location.

The following description of a preferred embodiment of the invention will suggest to those skilled in the art other objects, advantages and features of the invention.

THE DRAWING

THE CIRCUIT OF THE DRAWING

Introduction

Figure 1:
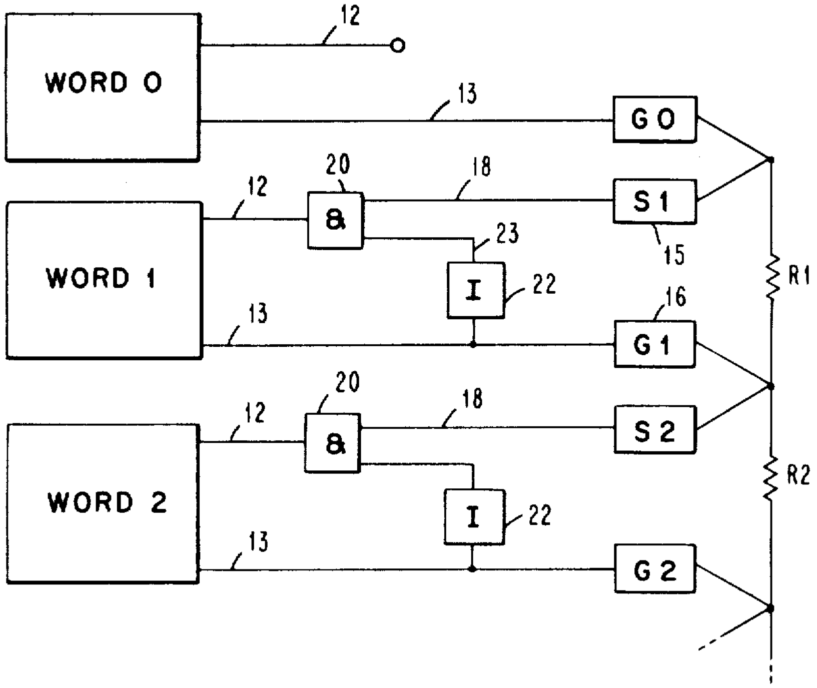
FIG. 1 is a block diagram of the selection circuit according to the invention.

FIG. 1 shows an associative memory having sequential word locations illustrated by the three locations designated W0, W1 and W2. The words of the memory are innerconnected with other components to perform associative memory operations. These components and innerconnections are conventional and are not shown in the drawing.

A selection circuit provides for selecting a sequence of words. An input 12 for each word is connected to word logic selection circuits to enable a selected word to undergo a read or write operation. The input 12 for word W0 is selectively energized by means of the conventional control circuits of the memory. Each other input 12 is energized from an output 13 of the preceding word. Output 13 is energized when the associated word has completed its part of the sequential operation. Our U.S. patent application Ser. No. 825,455, filed Oct. 23, 1968, discloses a memory of this type in more detail.

In the associative memory described in the copending application a word storage location is selected for accessing by setting a word selector trigger, uniquely associated with the word, to predetermined stable state. When read or write signals are subsequently applied to the associative memory, the settings of the selector triggers determine to which word location or locations the signals are to be directed. The copending application also describes the next operation in which the selector trigger of the word next to a word having a selector trigger in the predetermined stable state is set to the predetermined stable state.

The selection circuit to be described provides a mechanism whereby defective word stores are skipped in a next operation. Each word storage location except the first and last locations has a current sense circuit 15 and a current generating circuit 16. In FIG. 1 each circuit is referenced by the letter S or G followed by the number of the word to which the circuit belongs. The output of each generating circuit and the input of each sense circuit are directly connected to the nodes of a series connected chain of equal impedances, as shown resistors R1 and R2. The arrangement is such that the sense circuit of a word store is directly connected to the same node as the generating circuit of the preceding word store. In response to a signal at output 13 of the associated word, a generating circuit 16 causes an electrical current to flow at the node in the impedance chain to which it is connected. The signal at output 13 is derived in a conventional manner from the selector trigger (not shown) of the word location and may, for example, be generated by an output from a circuit (not shown) which is energized if and only if the selector trigger is in the predetermined stable state when a next operation is required. Each sense circuit 15 detects current at the node of the impedance chain to which it is connected and it signals the presence of current by activating an output line 18 which is one input to an AND circuit 20. AND circuit 20 is connected to energize the input 12 of the associated word. An invert circuit 22 is connected to apply the complement of the signal on line 13 to a second input 23 of AND circuit 20. Thus, the output 12 of the AND circuit 20 is energized if and only if the sense circuit of the same word location detects current and the generating circuit of the same word location is not energized. The signal at input 12 is used to set the selector trigger of the word store to the predetermined stable state.

Each sense circuit 15 is so designed that, with its power supply off it presents to the node to which it is connected a substantially higher impedance than the impedance of the impedance chain connected to the node. Preferably the sense circuit can be so designed that it presents approximately an infinite impedance to the node when no power is supplied to the circuit.

Means are provided to cut off the power supply to a defective word store. The defect may be detected during manufacture of the associative store or as a result of the detection (by conventional means) of incorrect data from the memory word location during its operation. Each power source may be connected to the word by means of a fuse and the power may be disconnected by applying such power as to blow the fuses. An example of this technique is described in the IBM Technical Disclosure Bulletin, vol. 10, No. 5, Oct. 1967 at page 547.

Operation

Suppose that the selector trigger of only word location W1 is in the predetermined stable state. Output 13 of word location W1 to generating circuit G1 is energized and current is caused to flow at the node between resistors R1 and R2 of the impedance chain. If word W2 is not defective, current flows between generating circuit G1 and sense circuit S2 in view of the direct connection, i.e., a connection with substantially no impedance, between these circuits. Since generating circuit G2 is not activated by a signal on its output 13, AND circuit 20 of word W2 is enabled to pass the output of sense circuit S2 and in consequence the selector trigger of word location W2 is set to the predetermined stable state. If word location W2 is defective but word location W3 (not shown) is not defective, sense circuit S2 presents a very high impedance to the node between resistors R1 and R2 and current at the node divides equally between resistors R1 and R2, resulting in the activation of sense circuits S1 and S3. Since, however, output 13 of word location W1 is energized, the output 12 of AND circuit 20 of word location W1 is not energized and the result is that only the selector trigger of word location W3 is set to the predetermined stable state. If both word location W2 and word location W3 are defective then the current at the node between resistors R1 and R2 divides with one-third going to the sense circuit of the words and two-thirds to sense circuit S1.

The operation described in the preceding paragraph shows a limitation to the circuit of FIG. 1. If $n$ successive words are defective, only $1/(n+1)$ of the current in the impedance chain reaches the next operable word. This fraction may be below the threshold of the sense circuit with the result that the next operable word store is not detected. Therefore, the sense circuits are designed such that the number of successive words defective to cause the current reaching a sense circuit to be below the operating threshold of the sense circuit is so large as to be statistically very unlikely to occur.

Figure 2:
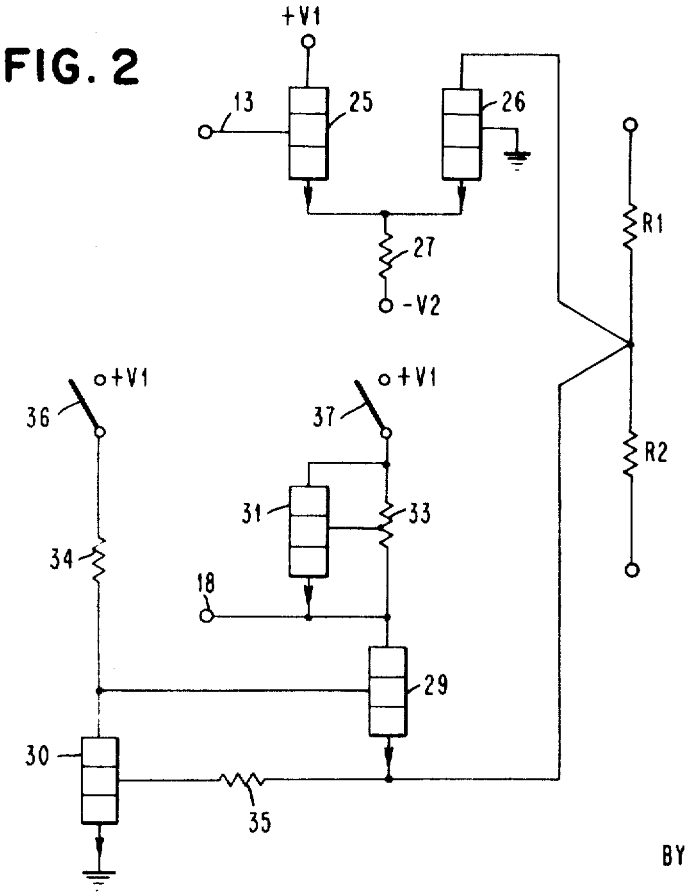
FIG. 2 is a circuit diagram of a sense circuit and a generating circuit for use in the selection circuit of FIG. 1.

The circuit of FIG. 2

FIG. 2 shows the preferred generating circuit 16 and sense circuit 15. The circuits are shown connected to the node between impedances R1 and R2 of the impedance chain. Generating circuit 16 comprises transistors 25 and 26 connected with a resistor 27 as a differential amplifier. The collector of transistor 25 is directly connected to a potential source, the collector of transistor 26 is directly connected to the node of the impedance chain, the base of transistor 26 is connected to ground, and the base of transistor 25 is connected to input line 13.

Sense circuit 15 comprises an output transistor 29, a control transistor 30 and a transistor 31 which is arranged as a clamp circuit with a resistor 33. The collector of transistor 29 is connected through resistor 33 to a potential source and directly to input line 12. The emitter of transistor 29 is directly connected to the node of the impedance chain and through an appropriately valued resistor 35 to the base of transistor 30, the collector of which is directly connected to the base of transistor 29 and to a potential source through a collector resistor 34. The emitter of transistor 30 is connected to ground.

In the quiescent state of the selection circuit, current flows in generating circuit 16 through transistor 25. The components of the sense circuits are matched such that the potentials at the nodes of the impedance chain are equal and no current flows into the chain from potential sources through transistors 29 of the sense circuits. Upon the application of a control signal on input line 13 transistor 25 of generating circuit 16 is cut off and transistor 26 draws current from the node of the impedance chain to which its collector is connected. If the associated word is not defective the potential source of sense circuit 15 are active and current is drawn through transistor 29, under the control of regulating transistor 30, to transistor 26 of the generating circuit. The clamp circuit comprised of transistor 31 and resistor 33 maintains the collector voltage of transistor 29 constant and the change in current through transistor 29 is reflected as a change in current on input line 12. If the associated word is defective and the next word is not defective sense circuit 15 is inoperative due to the absence of potentials and the current through transistor 26 is drawn, as explained above, one half from the preceding sense circuit 15 and one half from the next sense circuit.

Circuit disabling means 36, 37 is provided to disable sense circuit 15. Means 36, 37 is shown schematically as a switch and may be fuses, as already experienced, or other controllable switch devices. When switches 36, 37 are open, the sense circuit is inoperable. The resistor 35 and the other components of the circuit isolate the defective word from the resistor chain.

Figure 3:
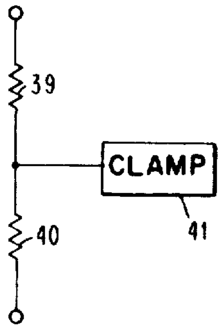
FIG. 3 is a diagram of another selection circuit according to the invention.

The embodiment of FIG. 3

The circuit described so far is intended for a memory that does not require simultaneous sensing of an input and generation of an output by the same word. The impedance chain shown in FIG. 3 provides for a simultaneous sensing of an input and generation of an output. The network of FIG. 3 is connected in the circuit of FIG. 1 where FIG. 1 shows individual resistors. Each impdeance element of the chain of the embodiment of FIG. 3 comprises a pair of series connected impedances 39 and 40 which are preferably resistors. A clamp circuit 41 is connected to the node between impedances 39 and 40. The clamp isolates the input of a sense circuit from the output of the associated generator. With the arrangement of FIG. 3 it is unnecessary to inhibit the output of the preceding sense circuit when a generating circuit 16 is operated and simultaneous output and input can be achieved at any word location. The resistors of either embodiment may be replaced each by a diode or by a network of diodes.

From a more general standpoint, the resistors R1, R2 are 0 circuit paths that bypass the next location and an operable sense circuit directs the signal from the chain through its lower input impedance. An inoperable sense circuit is disconnected from the chain because its input impedance is high in relation to the impedance of the chain preferably made of passive components so that the chain can be built as part of a location but be independent of the power supply of the location.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a system having a plurality of locations each operable in response to an input signal to undergo a predetermined storage or logic operation and to produce an output signal signifying the completion of the operation wherein the improvement comprises, first circuit means for each location having a low impedance input when operable and connected to receive the output of the preceding location and to transmit said output to the input of the associated location to begin an operation, alternate circuit means connected to transmit said signal from the output of each location to the input of the circuit means for the second next location, thereby bypassing the next location, said alternate circuit means having a higher impedance than said input of said first circuit means, and means for giving said circuit means a high input impedance in event of a defect in the associated location whereby an output signal is bypassed from the defective location to the next location.

2. The system of claim 1 in which said alternate circuit means is a passive component whereby it remains operable on failure of the associated location.

3. In a system having a plurality of locations each operable in response to an input signal to undergo a predetermined storage or logic operation and to produce an output signal signifying the completion of the operation wherein the improvement comprises, passive circuit means connected in a chain from one location to the next to transmit said output signals from one location to subsequent locations, second circuit means for each location connected to receive the output of the preceding location independently of said chain, said circuit means having a low impedance input when operable to thereby suppress transmission of said output signal through chain, and means for giving said second circuit means a high impedance input in event of a defect in the associated location to thereby bypass said signal around a defective location.

4. The system of claim 3 further including for each location logic circuit means connected to be responsive to the output of the associated location to prevent the location from responding to an output of a preceding location when its operation is completed.

5. The system of claim 3 in which said passive circuit means is a resistor chain.

6. The system of claim 3 in which said passive circuit means is a semiconductor device.

7. The system of claim 3 in which said second circuit means is an active circuit and said means for giving said second circuit means a high impedance includes switch means connected in the power supply to said second circuit means to selectively disable one of said second circuit means.

8. The system of claim 7 in which said switch means are fuses.

9. The system of claim 3 further including means to isolate said input of said second circuit means for each location from a simultaneously occurring output signal from the same location.

References Cited

UNITED STATES PATENTS

| | | |
|---|---|---|
| 3,222,653 | 12/1965 | Rice. |
| 3,245,049 | 4/1966 | Sakalay. |
| 3,422,402 | 1/1969 | Sakalay. |
| 3,434,116 | 3/1969 | Anacker. |
| 3,444,526 | 5/1969 | Fletcher. |

GARETH D. SHAW, Primary Examiner